US007267535B2

(12) United States Patent
Lupke et al.

(10) Patent No.: US 7,267,535 B2
(45) Date of Patent: Sep. 11, 2007

(54) PIPE MOLDING APPARATUS WITH MOLD TUNNEL AIR TURBULENCE

(76) Inventors: Manfred A. Lupke, 92 Elgin Street, Thornhill, Ontario (CA) L3T 1W6; Stefan A. Lupke, 32 Vintage Lane, Thornhill, Ontario (CA) L3T 1X6

( * ) Notice: Subject to any disclaimer, the term of this patent is extended or adjusted under 35 U.S.C. 154(b) by 33 days.

(21) Appl. No.: 10/534,739

(22) PCT Filed: Nov. 12, 2003

(86) PCT No.: PCT/CA03/01720

§ 371 (c)(1),
(2), (4) Date: May 12, 2005

(87) PCT Pub. No.: WO2004/045829

PCT Pub. Date: Jun. 3, 2004

(65) Prior Publication Data

US 2006/0013911 A1    Jan. 19, 2006

(30) Foreign Application Priority Data

Nov. 18, 2002  (CA) .................................. 2412066

(51) Int. Cl.
*B29C 47/88* (2006.01)
*B29C 47/90* (2006.01)

(52) U.S. Cl. ............... 425/72.1; 425/326.1; 425/336; 425/369; 425/384; 425/392; 425/396

(58) Field of Classification Search ............... 425/72.1, 425/233, 325, 326.1, 336, 369, 384, 392, 425/396
See application file for complete search history.

(56) References Cited

U.S. PATENT DOCUMENTS

| 3,997,292 | A | * | 12/1976 | Lutes et al. | ..................... 8/158 |
| 4,136,143 | A | * | 1/1979 | Lupke et al. | ............... 264/508 |
| 4,500,284 | A | * | 2/1985 | Lupke | ......................... 425/511 |
| 4,510,013 | A | * | 4/1985 | Lupke et al. | ............... 156/498 |
| 4,710,337 | A | * | 12/1987 | Nordstrom | ................... 264/508 |
| 4,897,093 | A | * | 1/1990 | Thelin | ........................... 95/242 |
| 5,028,376 | A | * | 7/1991 | Vanderwoude | ............. 264/566 |
| 5,525,289 | A | * | 6/1996 | Lupke et al. | ............... 264/508 |
| 6,551,534 | B1 | * | 4/2003 | Kirjavainen et al. | ..... 264/37.17 |

* cited by examiner

*Primary Examiner*—Robert Davis
*Assistant Examiner*—Joseph Leyson

(57) ABSTRACT

An extruding apparatus which extrudes continuous length of hollow plastic product has an extruder (3) which feeds molten plastic through die equipment (5) to a mold tunnel (7) formed by side by side moving mold blocks (9). The apparatus includes air turbulence internally of the product within the mold tunnel to assist in setting shape of the product. The air turbulence is provided by an air moving member (17) located internally of the product within the mold tunnel and a power source for the air moving member. The power source is located externally of the mold tunnel and a power transfer is provided to feed power from the power source through the die equipment to the air moving member without cooling of the die equipment.

8 Claims, 6 Drawing Sheets

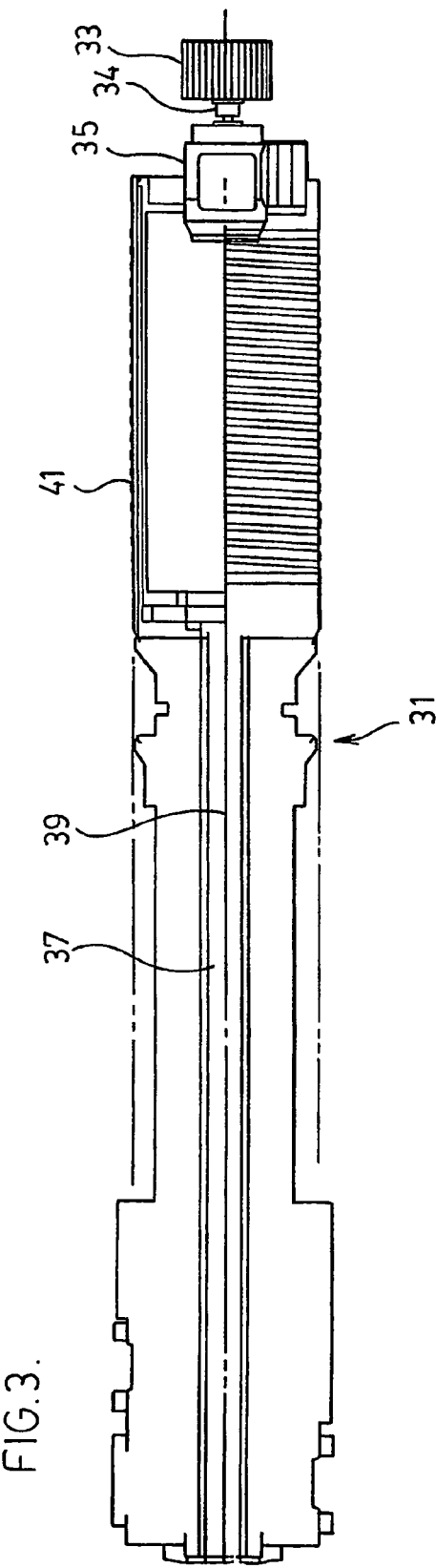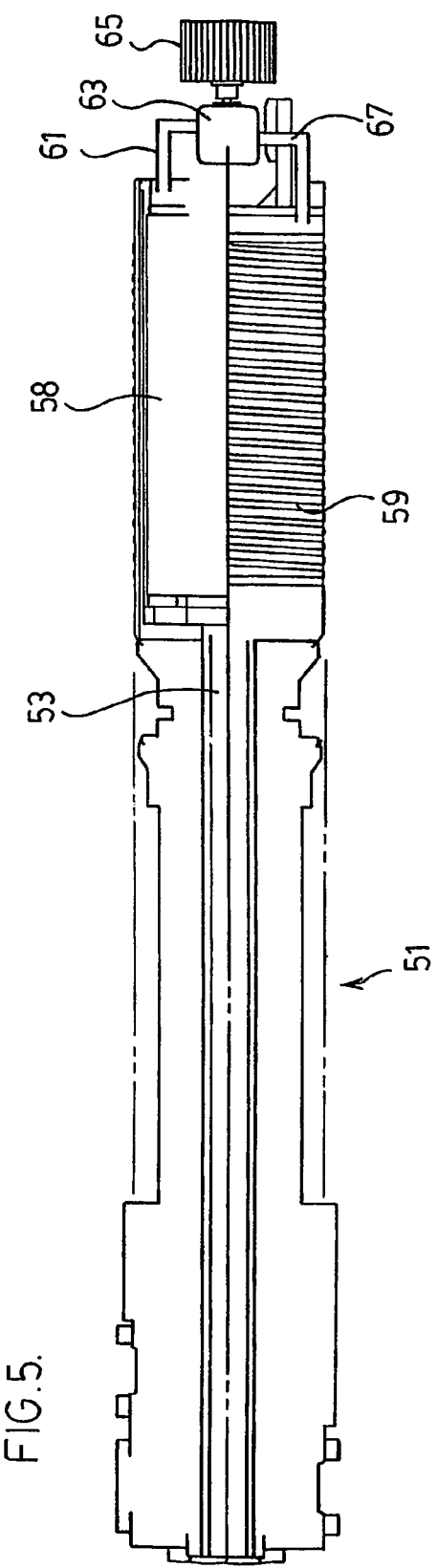

PIPE MOLDING APPARATUS WITH MOLD TUNNEL AIR TURBULENCE

FIELD OF THE INVENTION

The present invention relates to a molding apparatus using a moving mold tunnel with internal air turbulence to help set shape of the product in the mold tunnel.

BACKGROUND OF THE INVENTION

It is known in plastic extruders which use moving mold tunnels that it is important to provide efficient cooling within the mold tunnel. This efficiency is required because a moving mold tunnel is relatively short in length compared to fixed extruders.

Corma Inc. of Toronto, Ontario, Canada has over the last few years developed different cooling methods to cool plastic pipe formed in a moving mold tunnel extruder. Some of these methods have involved the pushing of air from the downstream end of the mold tunnel in an upstream direction into the mold tunnel. Corma Inc. has avoided the moving of cooling air in a downstream direction to the mold tunnel because this would necessitate the cooling air passing through and undesirably cooling the actual die equipment. It would also heat the cooling air. This die equipment must stay in its heated condition to produce a proper flow of molten plastic through the die equipment to the mold tunnel.

SUMMARY OF THE PRESENT INVENTION

Corma Inc. has now discovered that pipe made in an extruder using a moving mold tunnel can be assisted to set to shape within the mold tunnel using air turbulence only internally of the mold tunnel without necessarily having to add additional cooling to the air turbulence.

In view of the Corma Inc. discovery the present invention relates to an extruding apparatus which extrudes continuous length of hollow plastic product e.g., plastic pipe or the like and having internal mold tunnel turbulence. The apparatus comprises an extruder which feeds molten plastic through die equipment to a mold tunnel formed by side by side moving mold blocks. The plastic product is shaped within the mold tunnel. The apparatus includes means to provide air turbulence to assist in setting shape of the product. The means to provide the air turbulence comprises an air moving member which is physically located internally of the product in the mold tunnel. Also provided is a power source for the air moving member. The power source is however located externally of the mold tunnel and powers the air moving member through a power transfer which feeds from the power source through the die equipment to the air moving member.

In accordance with the invention as described immediately above, there is no transfer of moving air through the die equipment which would have an adverse affect of cooling the die equipment. In contrast, even though the power source for the air moving member is outside of the mold tunnel the only air movement is created internally of the mold tunnel with the means to transfer power from the power source to the air moving member feeding through the die equipment. This transfer means does not produce any adverse cooling of the die equipment.

The feeding of power to the air moving member from the power source to the air moving member through the die equipment upstream of the mold tunnel eliminates the need to place additional working equipment at the downstream end of the tunnel where it would be difficult to position because of the continuous outfeeding of the product through the downstream end of the tunnel.

BRIEF DESCRIPTION OF THE DRAWINGS

The above as well as other advantages and features of the present invention will be described in greater detail according to the preferred embodiments of the present invention in which;

FIG. 3 is a side view of die equipment with downstream end air turbulating features to be incorporated into a plastic pipe extruder with moving mold tunnel according to a further preferred embodiment of the present invention;

FIG. 5 is a side view of die equipment with downstream end turbulating features to be incorporated into a plastic pipe extruder with a moving mold tunnel according to yet another preferred embodiment of the present invention;

DETAILED DESCRIPTION ACCORDING TO THE PREFERRED EMBODIMENTS OF THE PRESENT INVENTION IN WHICH

Figure 1:
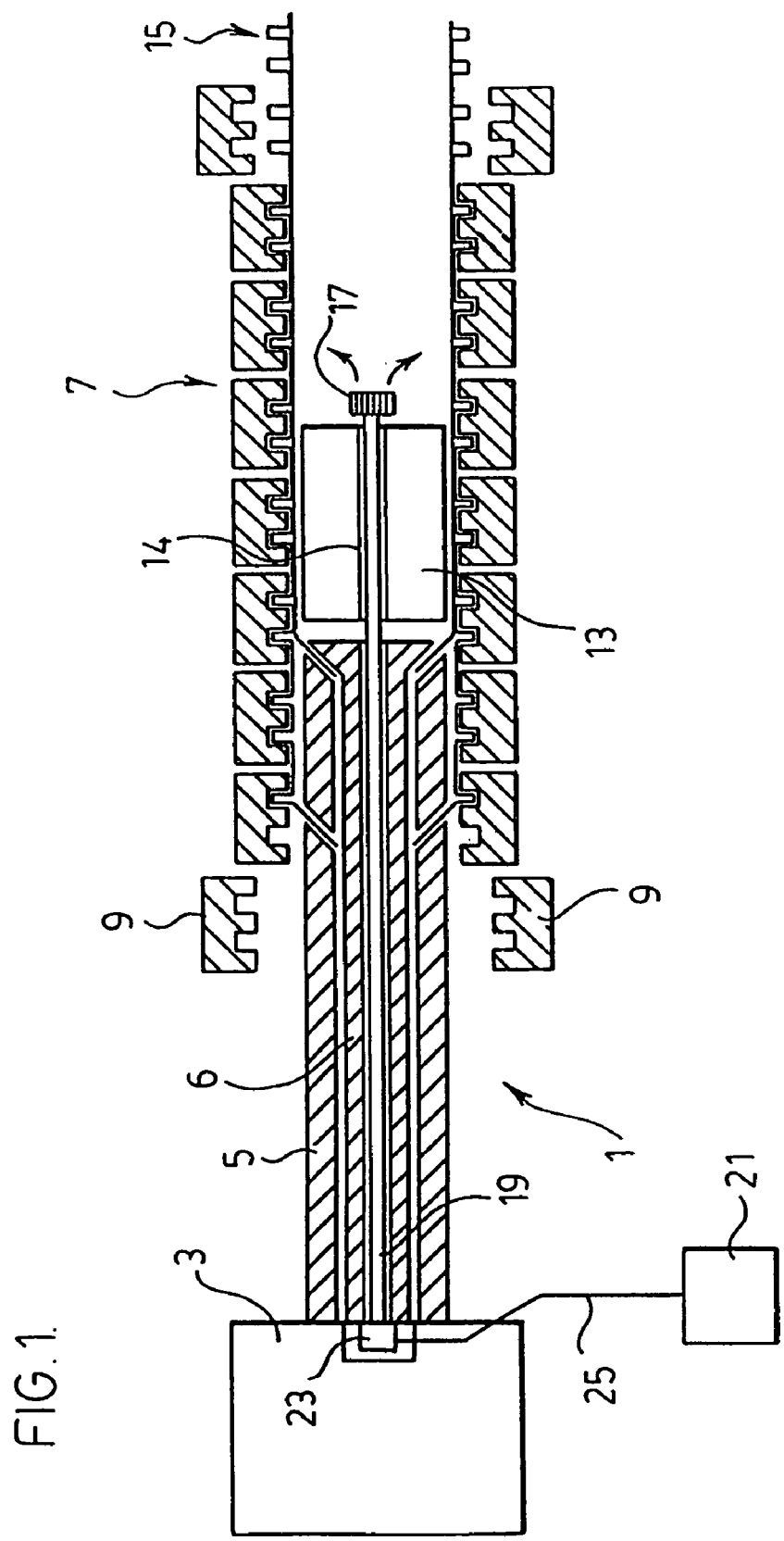
FIG. 1 is a schematic view of a plastic pipe extruder with a moving mold tunnel incorporating air turbulence within the mold tunnel according to a preferred embodiment of the present invention.

FIG. 1 shows a pipe extruding apparatus generally indicated at 1. This apparatus includes an extruder 3 which provides a supply of molten plastic along die equipment 5 to a moving mold tunnel generally indicated at 7. This mold tunnel is formed by mold block sections 9 to opposite sides of the tunnel. The mold block sections move side by side with one another and close around the downstream end of the die equipment to provide a molding path for forming a continuous length of plastic pipe generally indicated at 15. Located on the downstream end of die equipment 5 is a cooling plug 13 over which the plastic from the die equipment runs to help set the shape of the pipe which is also in place on the faces of the mold by suction through the mold blocks.

In accordance with the present invention, air turbulence is created internally of the pipe 15 while the pipe remains in the mold tunnel. This air turbulence assists in setting the shape of the pipe while it is in the mold tunnel.

Figure 2:
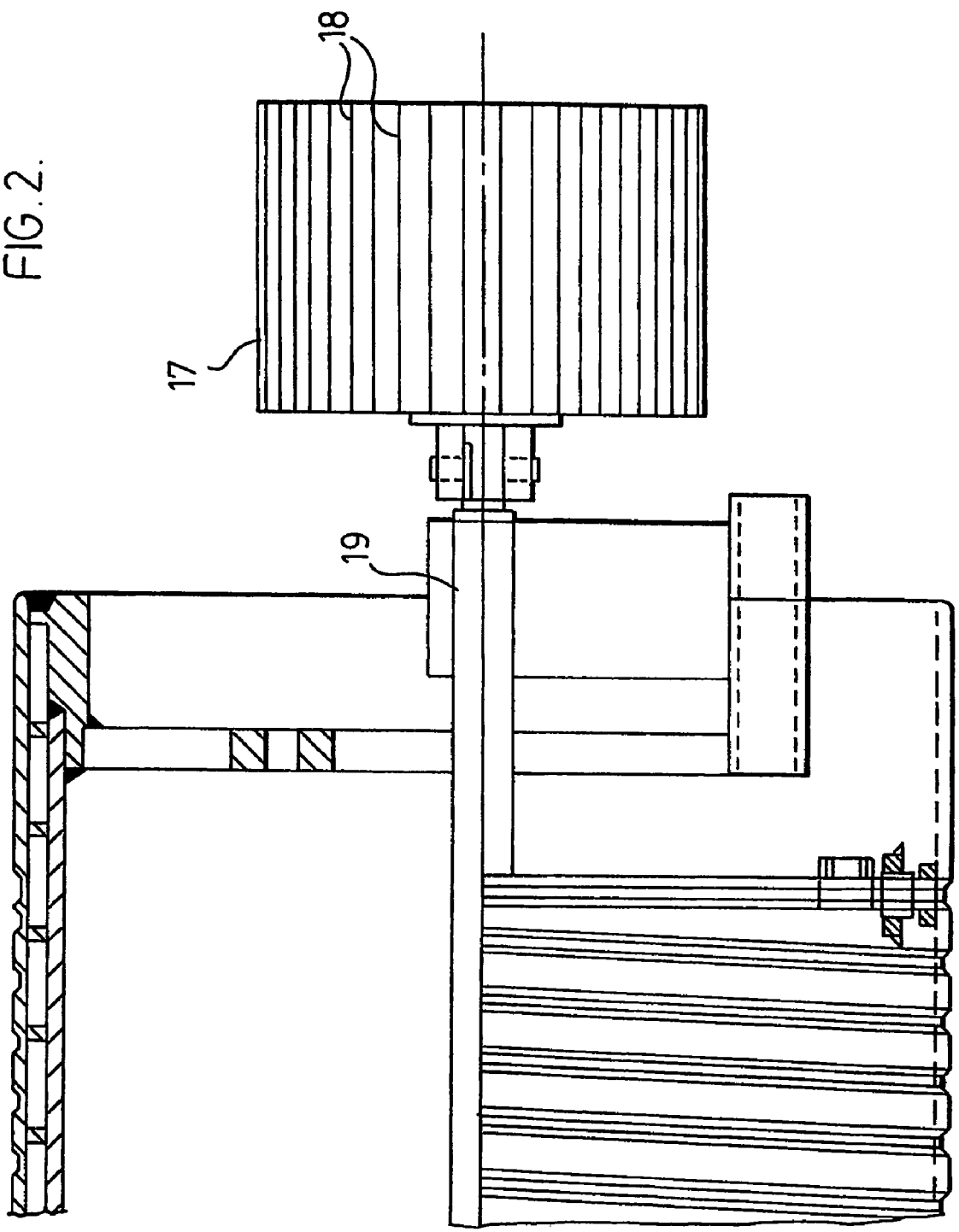
FIG. 2 is an enlarged view of the internal region of the mold tunnel from FIG. 1.
Figure 4:
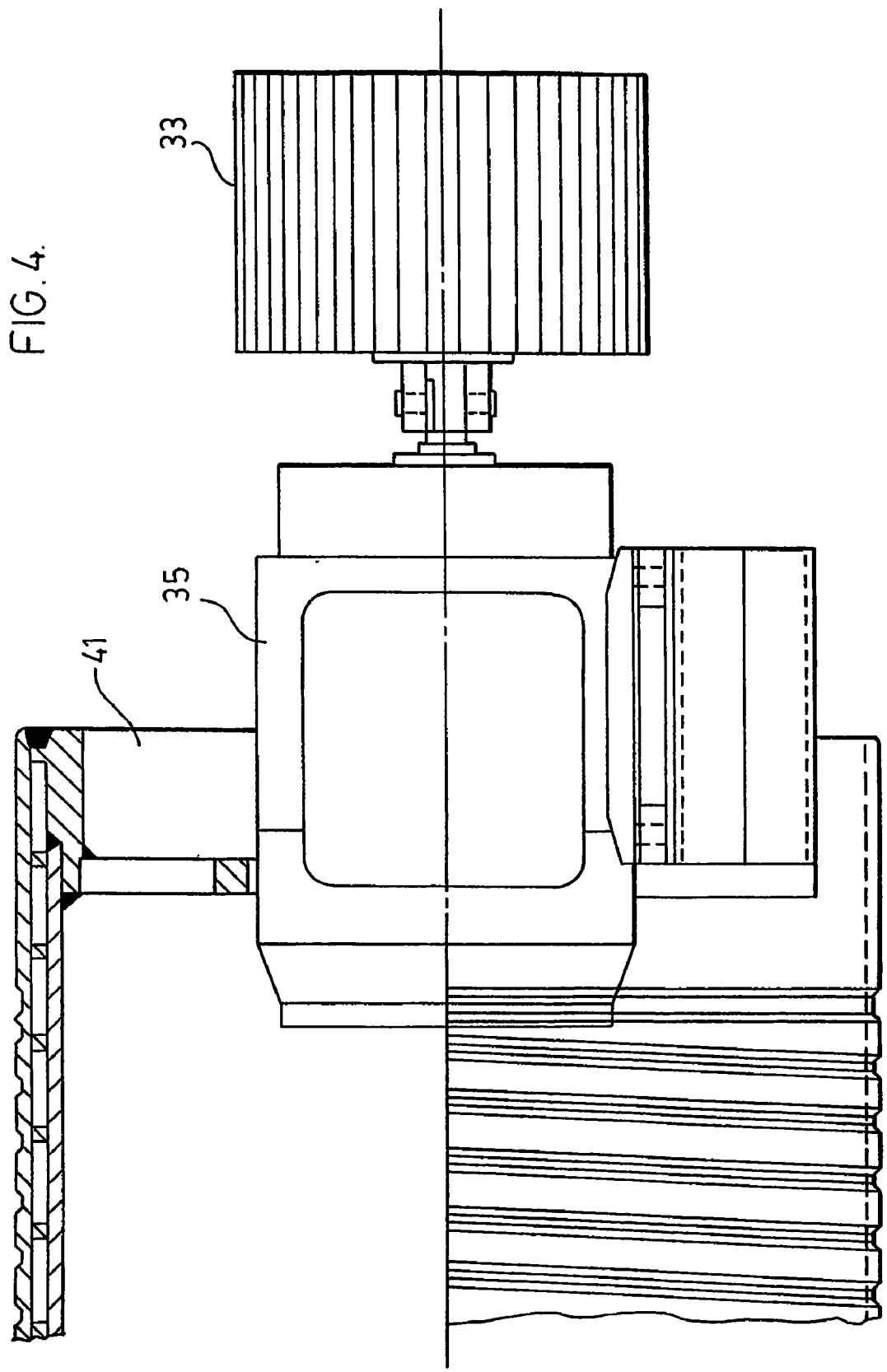
FIG. 4 is an enlarged view of the downstream end of the die equipment of FIG. 3.

The air turbulence is provided by means of an air moving member e.g., a rotor 17 which is physically located internally of the pipe at the downstream end of the cooling plug 13. In the embodiment shown in FIG. 1 of the drawings rotor 17 which, as better seen in FIG. 2 of the drawings, comprises a rotary wheel having a plurality of blades 18 peripherally of the wheel. This wheel is rotated by means of a drive shaft 19. This drive shaft fits through a channel 6 centrally of the die equipment 5 and then through a further channel 14 centrally of the cooling plug 13 to the rotor 17.

Shaft 19 has an upstream end which is located at the upstream end of die equipment 5 and which is rotated by a motor 23 located outside of the die equipment. Motor 23 is powered by an electrical power supply 21 wired at 25 to motor 23.

FIG. 3 of the drawings shows a modified version of a drive for a rotor internally of a moving mold tunnel. More specifically, FIG. 3 shows die equipment 31 and associated cooling plug 41. Provided at the downstream end of cooling plug 41 is a turbulence creating rotor 33. In this case, the motor 35 for rotating the rotor 33 is located directly beside the rotor. The cooling plug 41 is recessed at its downstream end providing mounting support for motor 35. Motor 35 then includes a shaft 34 extending to rotor 33.

The wiring 39 which provides electrical power for motor 35 feeds centrally through cooling plug 41 in an upstream direction back through a central channel 37 provided in die equipment 31. This wire then connects to a power supply outside of the apparatus.

In both of the above cases the rotor is operated by an electrically driven motor which in one example is located outside of the die equipment and the mold tunnel and which in another example is located directly within the mold tunnel. However, in both cases the electrical power for the motor is located outside of the die equipment and in neither case does the connection from the power to the rotor produce any cooling of the die equipment.

Figure 6:
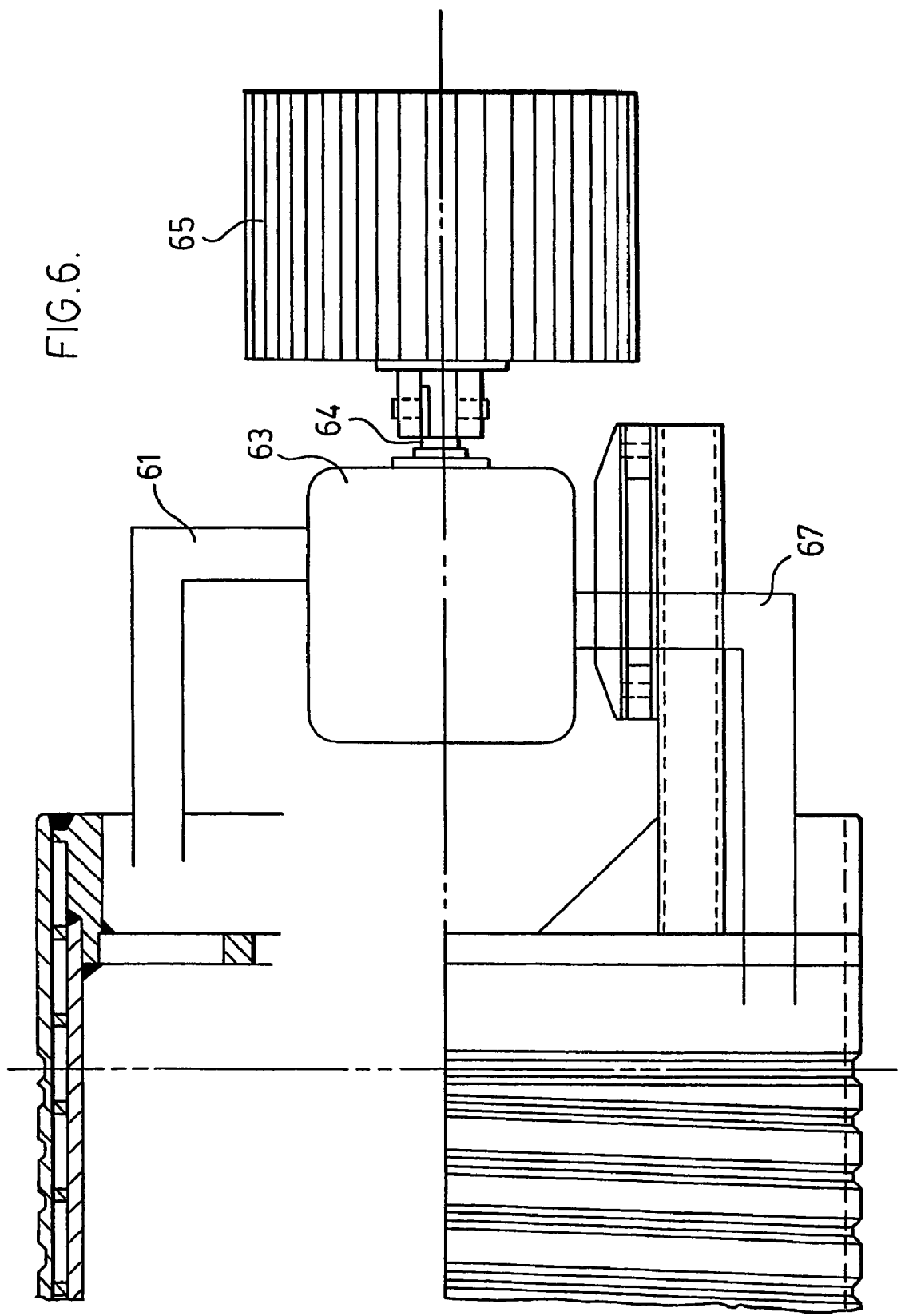
FIG. 6 is an enlarged view of downstream end of the die equipment of FIG. 5.

FIGS. 5 and 6 show another preferred embodiment of the present invention. According to this embodiment a bladed wheel air moving member 65 is provided at the downstream end of a cooling plug 58 which is in turn provided at the downstream end of die equipment 51. The cooling plug, the downstream end of the die equipment and the bladed wheel 65 when in use will all be located internally of a moving mold tunnel of a plastic extruder.

In this particular embodiment the die equipment 51 has a central channel 53 which feeds water under pressure to the closed coils 59 which wrap helically around cooling plug 58. Die 51 is well insulated around the water feed passage 53 to ensure that the die is not adversely cooled by the water and to further ensure that the water is not significantly heated by the die before it reaches the cooling plug.

In accordance with the present invention, the pressurized water flowing through the die and then flowing through the cooling plug is outlet from the cooling plug at a further flow line 61. This flow line directs the water still under pressure into a water turbine 63. Water turbine 63 is connected by drive shaft 64 to bladed wheel 65. The water turbine is sealed so that the water in the turbine does not escape into the mold tunnel but rather exits the turbine at a water outlet 67 which then flows back through passage 53 in die equipment 51.

The source of pressure for the water which drives turbine 63 and rotates rotor 65 is provided externally of the die equipment. In this case, the flow of pressurized water from that source provides the transfer of power from the pressurized water source through the die equipment to the turbine and the rotor.

Figure 7:
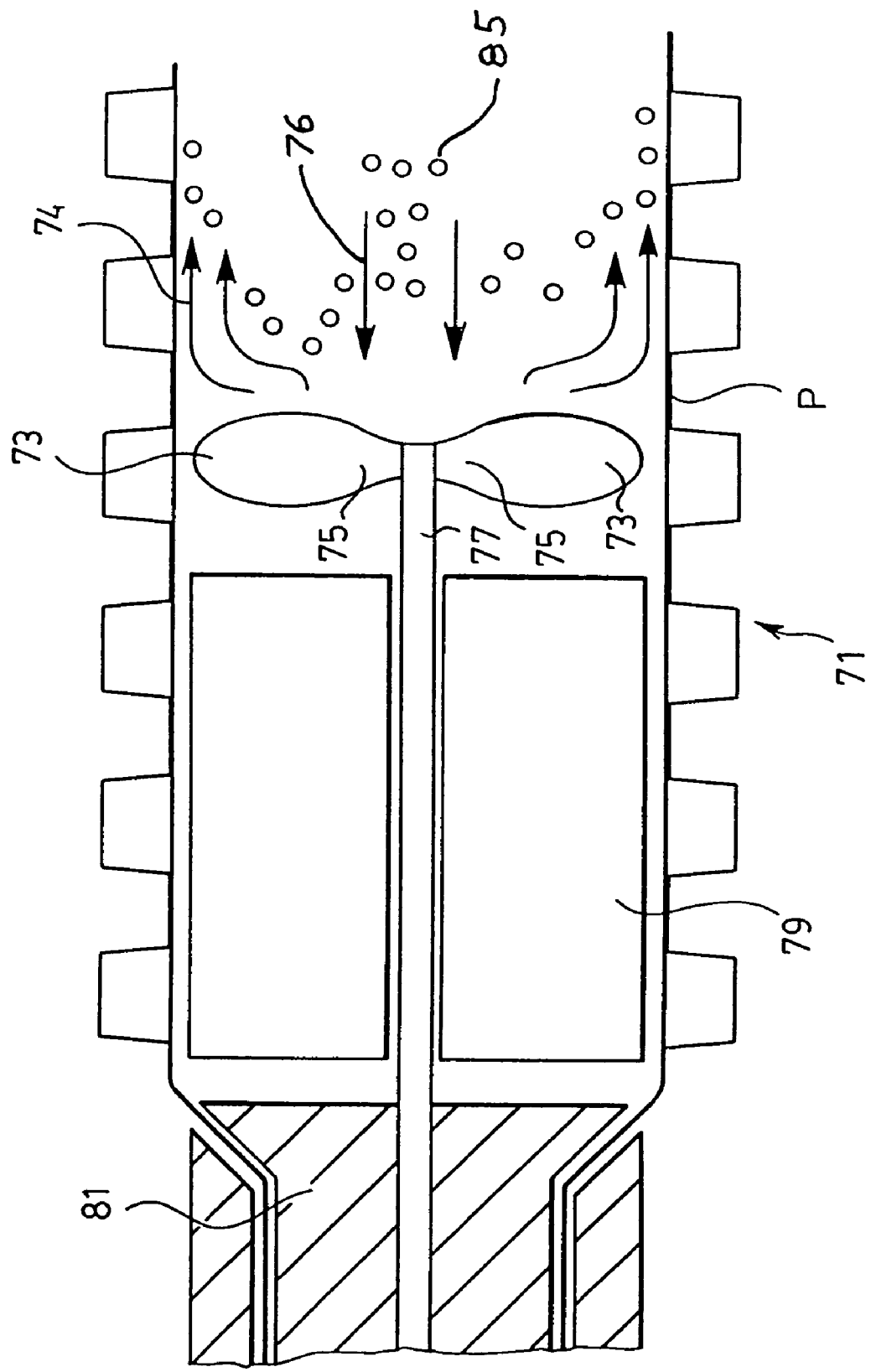
FIG. 7 is an enlarged view of the downstream end of die equipment for use with a plastic pipe extruder according to still a further preferred embodiment of the present invention.

FIG. 7 of the drawings shows another preferred embodiment of the present invention. According to this embodiment, an air turbulating system generally indicated at 71 is used to assist in setting shape of a plastic pipe P internally of a mold tunnel of a plastic extruder. Turbulating system 71 comprises a propeller style blade formed by a plurality of blade members each of which has a larger outer blade portion 73 and a smaller inner blade portion 75 secured to a drive shaft 77. Drive shaft 77 extends in an upstream direction centrally through a cooling plug 79 and die equipment 81 of the extrusion equipment. Once again, the power supply for rotating shaft 77 and the propeller style blades mounted to the shaft is located externally of the die equipment.

In this particular embodiment the propeller styling of the blade creates an extremely efficient air flow pattern. More particularly, the turbulence created by the outer blade portions 73 is greater than the turbulence created by the inner blade portions 75 of the blades. This produces an air flow pattern internally of the mold tunnel in which the air moved by the outer blade portions indicated by arrows 74 is relatively high pressure air forced to move in a downstream direction along the inner surface of pipe P. This air turbulence along the pipe helps to set the shape of the pipe while it is in the mold tunnel.

As a result of the above, air internally of the pipe which becomes heated as a result of its proximity to the pipe is forced out the open downstream end of the mold tunnel by the blades. At the same time, blade portions 75 of the blades which produce a much lower air pressure than blade portions 73 act as a negative pressure air draw. Therefore the inner blade portions draw cooler air in the direction of arrows 76 from outside of the mold tunnel into the open end of the tunnel in an upstream direction back to the propeller blade. This air then acts as make-up air for the air displaced in the downstream direction by the blades and has the benefit that it is cooler than the displaced air.

If additional setting of the pipe in the mold tunnel is required then further make-up air specifically cooled for pipe cooling purposes can also be introduced from the downstream end of the mold tunnel. In addition, moisture 85 can be added to the make-up air moved internally of the pipe by the air moving member to provide for further cooling of the pipe in the mold tunnel.

Although various preferred embodiments of the present invention have been described in detail, it will be appreciated by those skilled in the art that variations may be made without departing from the spirit of the invention or the scope of the appended claims.

The embodiments of the invention in which an exclusive property or priviledge is claimed are defined as follows:

1. An extruding apparatus which extrudes continuous length of hollow plastic product, said apparatus comprising an extruder which feeds molten plastic through die equipment to a mold tunnel formed by side by side moving mold blocks, the plastic product being shaped within the mold tunnel, said apparatus including means to provide air turbulence to assist in setting shape of the product, said means comprising a powered air moving member which is located internally of the product in the mold tunnel, a power source for powering said air moving member, said power source being located externally of the mold tunnel, and a power transfer member which feeds from said power source through said die equipment to said air moving member; and wherein said air moving member is a rotor having a plurality of blades with each blade having inner and outer blade portions, each of said blades being mounted at said inner blade portions to a common mounting shaft for rotating said blades, said inner and outer blade portions being arranged such that said outer blade portions provide greater positive air pressure than said inner portions to produce a low pressure air draw at said inner blade portions.

2. An extruding apparatus as claimed in claim 1 wherein said apparatus comprises a vacuum forming plastic pipe extruder including a cooling plug within the mold tunnel, the product comprising a hollow pipe shaped between the mold blocks and the cooling plug, said air moving member being located downstream of and adjacent to the cooling plug, said power transfer member feeding through the cooling plug to the air moving member.

3. An extruding apparatus as claimed in claim 1 wherein said mold tunnel has an open downstream end, the positive air pressure produced by said rotor causing an exhausting of air along the pipe through the downstream end of the tunnel, the low air pressure air draw providing fresh make up air to be drawn into the tunnel through the downstream end of the tunnel.

4. An extruding apparatus as claimed in claim 2 wherein said power transfer member comprises a rotary shaft extending through said die equipment and the cooling plug to said rotor.

5. An extruding apparatus as claimed in claim 4 including a motor for rotating said shaft, said motor being located externally of said die equipment and receiving power from an electrical power source.

6. An extruding apparatus as claimed in claim 2 including a motor for turning said rotor, said motor being coupled with said rotor in said mold tunnel, said power transfer member comprising an electrical power cord running through said die equipment and said cooling plug from a source of electric power to said motor.

7. An extruding apparatus as claimed in claim 2 wherein said rotor is driven by a water turbine adjacent said rotor in said mold tunnel, said power transfer member comprising a flow channel through said die equipment and said cooling plug, said flow channel delivering water under pressure from a source of pressurized water externally of said die equipment to said water turbine.

8. An extruding apparatus a claimed in claim 1 including a water supply for adding water to the air moved internally of the pipe by said air moving member.

\* \* \* \* \*